United States Patent
Schopf et al.

(10) Patent No.: US 6,799,378 B2
(45) Date of Patent: Oct. 5, 2004

(54) STYLUS

(75) Inventors: Reinhold Schopf, Trostberg (DE); Roland Fischer, Trostberg (DE)

(73) Assignee: Johannes Heidenhein GmbH, Traunreut (DE)

( * ) Notice: Subject to any disclaimer, the term of this patent is extended or adjusted under 35 U.S.C. 154(b) by 0 days.

(21) Appl. No.: 10/050,224

(22) Filed: Jan. 16, 2002

(65) Prior Publication Data
US 2002/0092192 A1 Jul. 18, 2002

(30) Foreign Application Priority Data
Jan. 16, 2001 (DE) .......................................... 101 01 925

(51) Int. Cl.[7] .............................................. G01B 5/00
(52) U.S. Cl. ......................................... 33/556; 33/503
(58) Field of Search ........................ 33/556, 557, 558, 33/559, 560, 561, 503

(56) References Cited

U.S. PATENT DOCUMENTS

| | | | | |
|---|---|---|---|---|
| 3,056,867 A | * | 10/1962 | Eitel ........................ 200/81 R |
| 4,027,669 A | * | 6/1977 | Johnston et al. ............ 604/110 |
| 4,153,998 A | * | 5/1979 | McMurtry .................... 33/556 |
| 4,220,151 A | * | 9/1980 | Whitney ...................... 604/110 |
| 4,270,536 A | * | 6/1981 | Lemelson .................... 604/110 |
| 4,275,505 A | * | 6/1981 | Delmas ........................ 33/558 |
| 4,301,338 A | * | 11/1981 | McMurtry ............... 200/61.41 |
| 4,375,723 A | * | 3/1983 | McMurtry .................... 33/559 |
| 4,556,351 A | * | 12/1985 | Wollar et al. ................. 411/38 |
| 4,826,372 A | * | 5/1989 | Kendall ....................... 411/43 |
| 5,318,537 A | * | 6/1994 | Van Der Merwe .......... 604/110 |
| 5,360,404 A | * | 11/1994 | Novacek et al. ............. 604/110 |
| 5,404,649 A | * | 4/1995 | Hajdukiewicz et al. ....... 33/503 |
| 5,517,124 A | * | 5/1996 | Rhoades et al. ............. 324/662 |
| 5,709,659 A | * | 1/1998 | Bennwik et al. ............. 604/110 |
| 5,819,429 A | * | 10/1998 | Matsuhashi .................. 33/558 |
| 6,036,671 A | * | 3/2000 | Frey ............................ 604/110 |
| 6,258,531 B1 | * | 7/2001 | Bienhaus et al. .............. 435/6 |
| 6,370,788 B1 | * | 4/2002 | Hellier et al. ................. 33/559 |
| 2002/0066198 A1 | * | 6/2002 | Schopf ........................ 33/559 |

FOREIGN PATENT DOCUMENTS

EP 0126207 11/1984

* cited by examiner

*Primary Examiner*—Diego Gutierrez
*Assistant Examiner*—Amy R Cohen
(74) *Attorney, Agent, or Firm*—Sidley Austin Brown & Wood, LLP

(57) ABSTRACT

A stylus having a stem covered, at least partially, with a coating formed of an elastically or plastically deformable synthetic material.

3 Claims, 2 Drawing Sheets

STYLUS

BACKGROUND OF THE INVENTION

1. Field of the Invention

The present invention relates to a stylus having a stem at a free end of which a tracer tip is provided, and to a coordinate-measuring apparatus in which the stylus is used.

2. Description of the Prior Art

The stylus of the type described above is used in coordinate-measuring apparatuses which perform different measuring tasks from a simple measurement of a distance between two objects to measurement of three-dimensional surfaces.

A conventional stylus, which is used in the coordinate-measuring apparatuses generally has a cylindrical stem at one end of which there is provided a mechanical tracer element (tip), mostly in form of a ground ruby ball with a predetermined radius. The tracer element is used for tracing the profile of a specimen. The opposite, from the tracer tip end is connected to a touch probe which insures, on one hand, the displacement of the stylus and, on the other hand, includes sensor for determining the movements of the stylus.

Coordinate-measuring apparatuses can be divided in several groups. The first group includes linear encoders in which a position of a movable, in a measuring direction, stylus is used as a measuring value. With this group, simple measurements of a distance between two objects can be effected, or a height profile of a workpiece movable relative to stylus, can be determined.

The second group of coordinate-measuring apparatuses includes a spring-biased stylus that can be deflected in all directions. The operation of these so-called three-dimensional systems can be based on different principles.

A three-dimensional system can include a linear or rotary encoder that determines the stylus deflection in all direction and, thereby, permits to determine the coordinate of the tracer tip. Such coordinate-measuring apparatuses are called measuring tracer systems. They permit to obtain measurement values during a statical or dynamic operation, i.e., the specimen and the tracer tip, at a time of measurement, can either remain immovable relative to each other or displace relative to each other.

The third group consists of so-called switching systems. In these systems, a stylus deflection generates a corresponding signal that is communicated to control means which then takes over the available coordinates from a measuring system of a machine-tool. The switching systems function only in a dynamic mode, i.e., after the touch signal is emitted, the displacement of the specimen or the tracer element should be stopped so that the maximum allowable deflection of the stylus is not exceeded.

For many applications, in order to avoid damaging of the sensitive mechanics or of the measuring system in case of an uncontrolled collision of a stylus with a specimen or with another part, it proved to be advantageous to provide the stylus with a breaking point. The breaking point prevents transmission of a large force from stylus to other elements of the measuring system. Instead of providing the stylus with a breaking point, the stylus can be so formed that in case of a collision, the stylus itself breaks.

Tests have shown that during the use of coordinate-measuring apparatuses with different machines, in particular, during testing of new control programs, occasionally, undesired collisions take place which result in breaking of the stylus. As these tests are often conducted with direct monitoring of the movable parts, possibly, with open safety doors of respective machines, there exists a danger that flying around fragments, which can be formed in case of collision, can hurt the person or persons monitoring the test. Moreover, the fragments can fall in areas accessible only with much difficulty, or they can damage the machine.

European Patent EP 0126207 discloses a probe or stylus for checking linear dimensions of mechanical workpieces and the movable arm of which is provided with intermediate elements having a breaking point. These breaking points or elements are prevented from breaking away by springs. However, such safety devices are very expensive.

Accordingly, an object of the present invention is to provide a stylus in which the fragments, in case of a break, are prevented from flying around and which at the same time can be economically manufactured.

Another object of the present invention is to provide a coordinate-measuring machine the stylus of which has a safety feature which prevents the stylus fragments from flying around in case of breaking of the stylus, and which stylus can be economically manufactured.

SUMMARY OF THE INVENTION

These and other objects of the present invention, which will become apparent hereinafter, are achieved by providing a stylus the stem of which is covered, at least partially, with a coating formed of an elastically or plastically deformable synthetic material; and by providing a coordinate-measuring machine in which the stylus having a protective coating is connected to the touch probe.

The elastically or plastically deformable synthetic materials can consist, e.g., of more or less cross-linked long carbon molecules, and can have different characteristics. The use of materials, which are not based on carbon, such as silicon is also possible.

Styluses are usually formed of a brittle material (e.g., steel or ceramics). These materials have good touch characteristics and are very rigid. The synthetic coating, which is formed of a deformable synthetic material, does not alter these characteristics in any significant manner. However, in case of breaking of a stylus, the fragments are retained by the synthetic coating, preventing them from damaging a tested object. The excess energy is not converted into a displacement energy of the fragments but is rather dissipated as a result of deformation of the synthetic coating, i.e., it is converted into a deformation energy. The forces, which act on the coordinate-measuring machine or its component, are substantially reduced in comparison with forces acting in case a stylus without a coating is used. This effect further increases when the coating is formed of materials having a high impact strength.

The novel features of the present invention, which are considered as characteristic for the invention, are set forth in the appended claims. The invention itself, however, both as to its construction and its mode of operation, together with additional advantages and objects thereof, will be best understood from the following detailed description of a preferred embodiment, when read with reference to the accompanying drawings.

DETAILED DESCRIPTION OF THE PREFERRED EMBODIMENT

Figure 1:
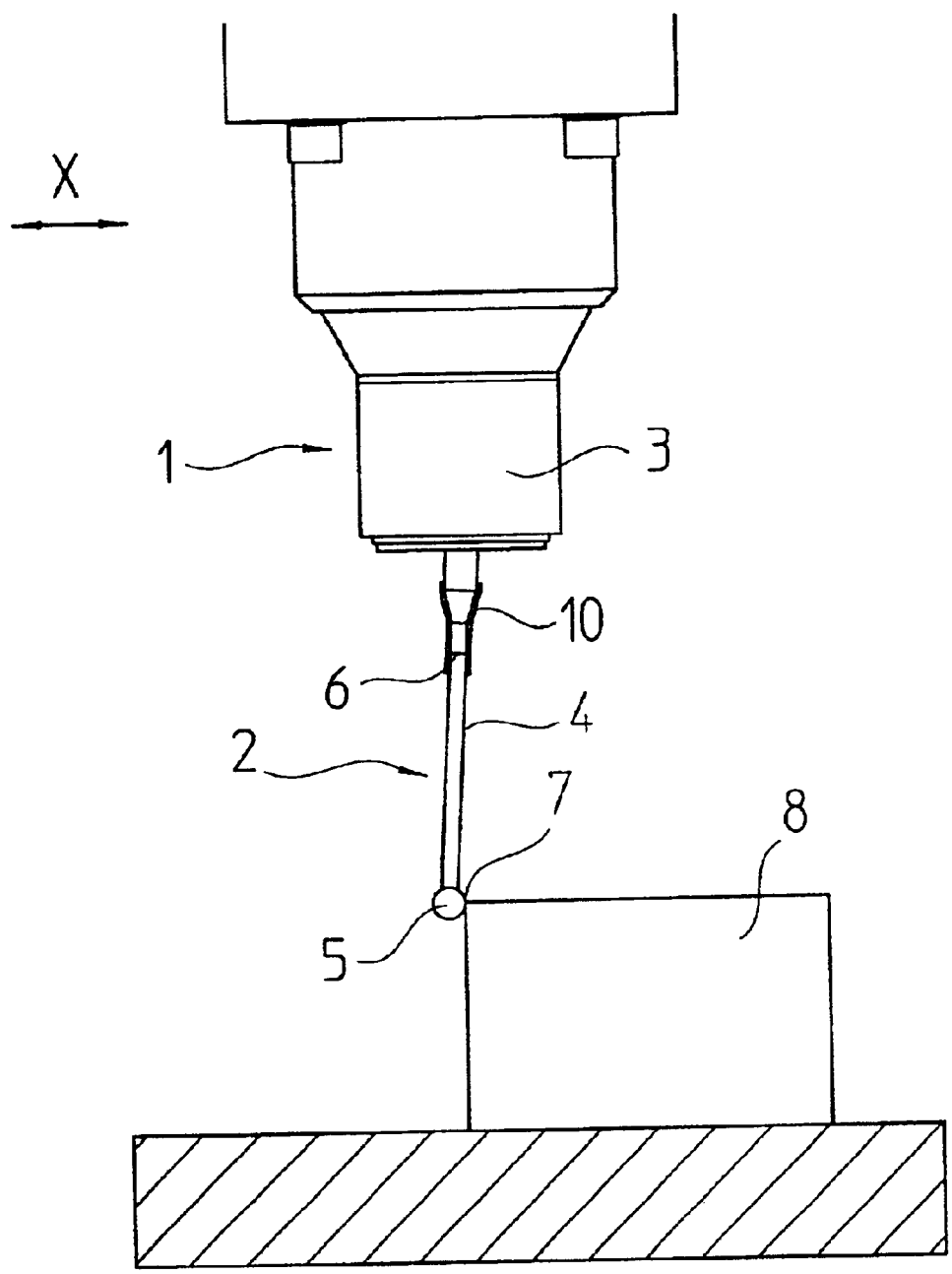
FIG. 1 a schematic view of a coordinate-measuring apparatus in which a stylus according to the present invention is used.

A coordinate-measuring apparatus 1, in which a stylus 2 according to the present invention is used, is shown in FIG. 1. The coordinate-measuring apparatus further comprises a touch probe 3. The stylus 2 is formed of a stem 4, which is made of hard metal, arid a tracer element 5 having a shape of a ground ruby ball. The stem 4 has a breaking point 6 in the region of which, stem 4 has a synthetic coating 10. The touch probe 3 includes a device which provides for displacement of the stylus 2 in all directions. The calculation of a traceable point 7 between the tracer element 5 and a tested specimen 8 is effected based on the tracing direction X and the position of the stylus 2.

Figure 2:
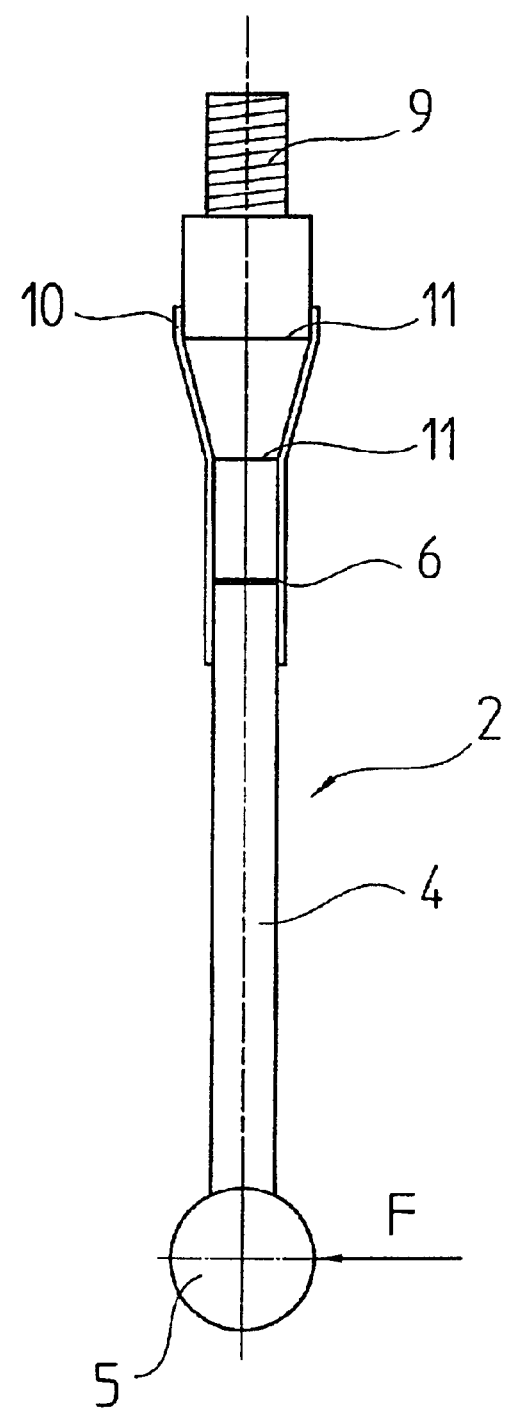
FIG. 2 an elevational view of a stylus according to the present invention with a synthetic coating.

The stylus 2 according to the present invention is shown separately in FIG. 2. As it has already been discussed above, the stylus 2 has a stem 4, a tracer element 5, and a breaking point 6. The stylus 2 also has a thread 9 with which the stylus 2 is screwed into the touch probe 3. As it has further been discussed above, the stylus 2 has, in the region of the breaking point 6, the synthetic coating 10. An application of a breaking force F to the tracer element should lead to breaking of the stylus 2 at its breaking point 6.

The reduction of the breaking force is effected using the so-called notch effect of the breaking point 6. Upon the application of the braking force F, notch stresses appear at the breaking point 6 which are noticeably higher than the stresses in an intact material, without the breaking point.

Advantageously, the synthetic layer 10 should be provided only in the region of the breaking point 6 as the stylus 2 can be broken only at the breaking point 6. This permits to save a valuable material and to reduce the weight of the stylus 2. Naturally, when the stylus is formed without a breaking point, the entire stylus stem can be provided with a synthetic coating. When providing the stylus 2 with the synthetic coating 10, it is important that edge-shaped transitional region 11 and other structures of the stylus 2, which function as notches, be covered with the coating, as the edge-shaped region and the notch-forming elements can function as breaking points.

For this reason, the synthetic coating 10 covers not only the region of the breaking point 6 but also the edge-shaped region 11 of the stem 4.

The synthetic coating 10 can be applied in several simple ways. Only some examples of application of the synthetic coating 10 will be discussed here. One way of applying a synthetic coating consists in placing a shrink sleeve over the stylus and shrink it. Rubber-like bushings can be put over the styluses. Also, viscid lacquers, resin, or silicone layers having a necessary thickness can be applied. The synthetic coating can also be provided by using the process of the fluidized bed coating.

A particularly favorable and simple embodiment of a stylus according to the present invention is obtained when the stylus 2 has a one-piece stem 4 on which a breaking point 6 in form of a circumferential notch is provided, and the synthetic coating is applied to the region of the breaking point 6. However stems with sections, which are formed as intermediate members, e.g., defining breaking points, can also be used.

It should be pointed out that the synthetic coating 10 has particular advantages. Before the stylus 2 breaks, the stress energy is stored in the deflected stylus 2. The process of breaking dissipates only a portion of this energy, the rest of the energy is converted into the movement energy of the stylus fragments if the movement of the fragments is not constrained by safety means. A flying fragment can hurt people which find themselves in the vicinity of the coordinate-measuring apparatus. A fragment of stylus 2, which remains at the coordinate-measuring means, transmit high acceleration forces to a very sensitive measuring system of the touch probe 3, which system should be protected by the breaking point 6.

The synthetic coating 10 serves for retaining the broken-off fragment. Therefore, any danger from flying around fragments is prevented. Experiments have shown that the greater is the impact resistance of the synthetic coating 10 the smaller are forces transmittable to the measuring system of the touch probe 3. Impact-resistance synthetic materials can absorb a very high energy per surface square unit upon application of an impact load. This is because the energy necessary for deformation of the synthetic material depends on the speed of the deformation that is rather low for the impact-resistant material. This is another advantage over the state of the art which encompasses use of springs the energy content of which is proportional to the deflection but does not depend on the deflection speed. In order to simulate an impact-resistant characteristic of a (elastically deformable) synthetic material with a spring, the spring should be connected parallel to a damping element. With a spring alone, plastic deformation cannot be simulated.

Though the present invention was shown and described with references to the preferred embodiment, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A coordinate-measuring apparatus, comprising touch probe; and a stylus connectable to the touch probe and including a stem having a breaking point formed as a circumferential notch; a shrink sleeve covering at least a section of the stem containing the breaking point; and means for connecting the stem with the touch probe and spaced from the breaking point.

2. A coordinate-measuring apparatus as set forth in claim 1, wherein the stem is formed as a one-piece member.

3. A stylus as set forth in claim 1, wherein the stem has means for connecting the stem with a touch probe, and wherein the breaking point is spaced from the connecting means.

* * * * *